United States Patent
Niakin

(10) Patent No.: US 6,811,588 B2
(45) Date of Patent: Nov. 2, 2004

(54) HIGH CAPACITY HYBRID MULTI-LAYER AUTOMOTIVE AIR FILTER

(75) Inventor: Shahriar Nick Niakin, Corona, CA (US)

(73) Assignee: Advanced Flow Engineering, Inc., Corona, CA (US)

(*) Notice: Subject to any disclaimer, the term of this patent is extended or adjusted under 35 U.S.C. 154(b) by 13 days.

(21) Appl. No.: 10/286,383

(22) Filed: Nov. 1, 2002

(65) Prior Publication Data

US 2004/0083697 A1 May 6, 2004

(51) Int. Cl.[7] .......................... B01D 29/01; B01D 39/04; B01D 46/12
(52) U.S. Cl. .......................... 55/385.3; 55/487; 55/498; 55/527; 55/528; 55/DIG. 24
(58) Field of Search .......................... 55/385.1, 385.3, 55/485–487, 497, 498, 503, 521, 527, 528, DIG. 24, DIG. 5

(56) References Cited

U.S. PATENT DOCUMENTS

| | | | | |
|---|---|---|---|---|
| 3,102,014 A | * | 8/1963 | Aitkenhead .................. | 96/429 |
| 3,290,870 A | * | 12/1966 | Jensen .......................... | 55/486 |
| 3,399,516 A | * | 9/1968 | Hough, Jr. et al. ........... | 55/487 |
| 3,400,520 A | * | 9/1968 | Sakurai ........................ | 55/487 |
| 4,197,100 A | * | 4/1980 | Hausheer ..................... | 55/382 |
| 4,257,791 A | * | 3/1981 | Wald ............................ | 55/382 |
| 4,259,096 A | * | 3/1981 | Nakamura et al. ........... | 96/138 |
| 4,323,374 A | * | 4/1982 | Shinagawa et al. ............ | 96/58 |
| 4,610,705 A | * | 9/1986 | Sarnosky et al. ............. | 96/135 |
| 4,632,682 A | * | 12/1986 | Erdmannsdorfer ........... | 55/498 |
| 4,728,349 A | * | 3/1988 | Oshitari ....................... | 55/487 |
| 5,800,586 A | * | 9/1998 | Cusick et al. ................. | 55/486 |
| 5,858,045 A | * | 1/1999 | Stemmer et al. .............. | 55/486 |
| 5,871,644 A | * | 2/1999 | Simon et al. ................ | 210/483 |
| 5,874,052 A | * | 2/1999 | Holland ...................... | 422/171 |
| 5,922,096 A | * | 7/1999 | Stemmer ...................... | 55/483 |
| 6,156,089 A | * | 12/2000 | Stemmer et al. ............. | 55/467 |
| 6,231,646 B1 | * | 5/2001 | Schweizer et al. ............. | 96/17 |
| 6,322,604 B1 | * | 11/2001 | Midkiff ....................... | 55/486 |
| 6,355,079 B1 | * | 3/2002 | Sorvari et al. ................ | 55/486 |
| 6,372,004 B1 | * | 4/2002 | Schultink et al. ............. | 55/382 |
| 6,387,141 B1 | * | 5/2002 | Hollingsworth et al. ...... | 55/486 |
| 6,521,011 B1 | * | 2/2003 | Sundet et al. ................. | 55/499 |
| 2001/0042361 A1 | * | 11/2001 | Cox et al. ..................... | 55/382 |
| 2002/0011051 A1 | * | 1/2002 | Schultheib et al. ........... | 55/382 |
| 2003/0010002 A1 | * | 1/2003 | Johnson et al. .............. | 55/486 |

* cited by examiner

*Primary Examiner*—Robert H. Spitzer
(74) *Attorney, Agent, or Firm*—K David Crockett, Esq.; Crockett & Crockett

(57) ABSTRACT

An automotive air filter including natural fiber filter media region, having piteous, absorbent, wickable natural fibers, a synthetic fiber filter media region including, absorbent spun-bond polyester filters. The natural fiber region receives an influent fluid stream containing particles, trapping some particles. The manufactured fiber region removes residual particles, producing a filtered effluent stream. The fluid stream passes unimpaired through the fiber pores. Two structural mesh layers sandwich natural and manufactured fiber regions. Oil is disposed in the oleophilic cotton mesh. Fiber regions have layers disposed in gradient density arrangement.

21 Claims, 3 Drawing Sheets

HIGH CAPACITY HYBRID MULTI-LAYER AUTOMOTIVE AIR FILTER

FIELD OF THE INVENTIONS

The inventions described below relate the field of automotive air filters and air cleaners for engine air intake systems.

BACKGROUND OF THE INVENTIONS

Most people are familiar with air filters used in their cars. These filters are essential to proper operation of the engine, and help extend the life of the engine and its components. Automotive air filters must be replaced periodically because they become clogged and thus inhibit the flow of air into the engine. To the typical consumer, the air filter is cheap, and its replacement is a small additional bother that is handled along with oil changes. However, in high performance applications and in industrial and farming applications, the cost of air filters and the burden of replacement is significant, and a significant increase in filter performance and lifespan can be very valuable.

The air available to the typical automotive or industrial combustion engine always includes some dirt and debris, or particulate material. Particulate material can cause substantial damage to the internal components of the particular combustion system if taken into the engine. The function of the air intake filter is to remove the particulate matter from the intake air, so that clean air is provided to the engine. The intake air stream flows from the influent, or "dirty," side of the filter to the effluent, or "clean," side of the filter, with the air filter extracting the unwanted particles via one or more filter media layers. Filter media are selected to trap particles exceeding a particular size, while remaining substantially permeable to air flow.

The choice of filter media which has a high filter efficiency (that is, it removes a high percentage of the particulate material in the intake air) is important because any particulate matter passing through the filter will harm the engine. The choice of filter media which is permeable to air flow is important because the interposition of the filter into the intake air stream can impede air flow, and this decreases engine efficiency, horsepower, torque, and fuel economy. It is desirable, then, that an air filter effect both a minimal reduction in airflow as well as a minimal increase in the resistance, or restriction, to air flowing into the engine. The choice of filter media which can effectively filter air for extended periods without becoming clogged is also important, so that operation of the engine need not be interrupted frequently to change the air filter.

The features and filter design choices that lead to improvements in one of these parameters can lead to losses in the other performance parameters. Thus, filter design involves trade-offs among features achieving high filter efficiency, and features achieving a high filter capacity and concomitant long filter lifetime. As used herein, filter efficiency is the propensity of the filter media to trap, rather than pass, particulates. Filter capacity is typically defined according to a selected limiting pressure differential across the filter, typically resulting from loading by trapped particulates. For systems of equal efficiency, a longer filter lifetime is typically directly associated with higher capacity, because the more efficiently a filter medium removes particles from a fluid stream, the more rapidly that filter medium approaches the pressure differential indicating the end of the filter medium life.

A particular filter medium can be very efficient, with a single layer removing a large percentage of the particles entrained in the fluid, for example, by collecting particles as a dust cake on the dirty side of the filter. Such "surface-loading" media includes paper and dense mats of cellulose fibers, with small pores. Initially, the dust cake can increase filter efficiency by itself operating as a filter. Over time, the dust cake tends to shorten the media lifetime, as more trapped particles occlude the filter medium surface pores, resulting in increased differential pressure across the filter. Depending upon the airflow through, and operating conditions of, the filter, a high-efficiency surface-loading filter medium can quickly reach a lifetime load. To extend filter lifetime, filter media can be pleated, providing greater filtering surface area.

On the other hand, a particular filter medium can have a relatively low efficiency but high fluid permeability. To provide the desired degree of efficiency, a high-capacity filter may be constructed of a stack, or multiple layers, of lower-efficiency mesh media. Particles that are not trapped by one layer of the filter medium can be removed by an adjacent layer of, or region within, the filter medium. Because the filtration process occurs across the depth, or volume, of the filter, media of this type are designated "depth-loading" media, and can include foam webs and porous mats of synthetic material.

Depth-loading media can have a substantially uniform density across depth of the media, or can have a varying, gradient density. Uniform-density depth-loading media can be less expensive to produce than gradient-density depth-loading media. However, gradient-density depth-loading media tends to be more efficient. As with a filter constructed of surface-loading media, the lifetime of a depth-loading media can be extended by pleating the filter media. Nevertheless, increasing the thickness of filter media or providing excessive pleating can restrict airflow into the engine.

Currently available air filters balance the various design parameters to achieve the optimal balance of efficiency, flow rate and life span by accepting relatively short life span and single-use embodiments in order to obtain high efficiency and capacity. The deleterious effects of certain harsh operating environments, such as construction sites, long haul operations and off-road, recreational, and sports applications, can lead to degraded efficiency or unacceptably short lifetimes in these air filters, especially under high airflow conditions.

SUMMARY

The devices described below provide for an extremely long-lived engine air filter which exhibits high efficiency and high capacity. The filter comprises a fluid filter media and a fluid filter including a porous natural fiber filter media region receiving an influent fluid stream containing particles; and a porous synthetic fiber filter media region in proximate contact, and in fluid communication with, the natural fiber filter media region from which it receives a filtered fluid stream. The natural fiber filter media is formed from pileous, absorbent, and wickable natural fibers, including one or more layers of cotton mesh; and the synthetic fiber filter media region is formed from a pre-selected pileous and absorbent spunbond polyester fiber formed of one or more layers of spunbond polyester fiber.

The natural fiber filter media region traps a first portion of the particles in the influent fluid stream while the influent fluid stream passes substantially unimpaired through the pores, and creates a filtered fluid stream having therein a second portion of the particles. The synthetic fiber filter media region receives the filtered fluid stream and traps a substantial amount of the second portion of particles in the filtered fluid stream, while the filtered fluid stream passes substantially unimpaired through the pores, and releasing a filtered effluent fluid stream. The filter also includes two structural mesh layers with the natural fiber filter media region and the synthetic fiber filter media region being interposed between them. The natural fiber filter media is wetted with a small amount of oil to enhance its efficiency.

The filter may include at least one of a gradient-density natural fiber filter media region, and a gradient-density synthetic fiber filter media region. In the gradient-density natural fiber filter media region, a first cotton mesh layer has a first cotton mesh density, and a second cotton mesh layer has a second cotton mesh density. The first cotton mesh density is less than the second cotton mesh density. Accordingly, the first cotton mesh layer is disposed closer to the receiving of the influent air stream, and the second cotton mesh layer is disposed closer to the filtered effluent air stream. In the gradient-density synthetic fiber filter media region, a first spunbond polyester fiber layer has a first polyester fiber density, and a second spunbond polyester fiber layer has a second polyester fiber density. The first polyester fiber density is less than the second polyester fiber density. Accordingly, the first spunbond polyester fiber layer is disposed closer to the second cotton mesh layer, and the second spunbond polyester fiber layer is disposed closer to the filtered effluent air stream.

In a simple embodiment, the filter comprises several gauze layers and one or two spunbond polyester layers sandwiched between two metal screens. The gauze is a thin, loosely woven cotton cloth having a relatively low thread count (threads per inch). The gauze layers in the filter each have differing thread counts, so that the air flow path through the combined several layers of gauze is tortuous. The polyester layers may also have differing densities. The thread count of the gauze layers increases from the intake side to the output side, as does the density of the polyester layers. In this manner, the gauze layers provide a very efficient filter with a high capacity and low resistance to air flow.

DETAILED DESCRIPTION OF THE INVENTIONS

Figure 1:
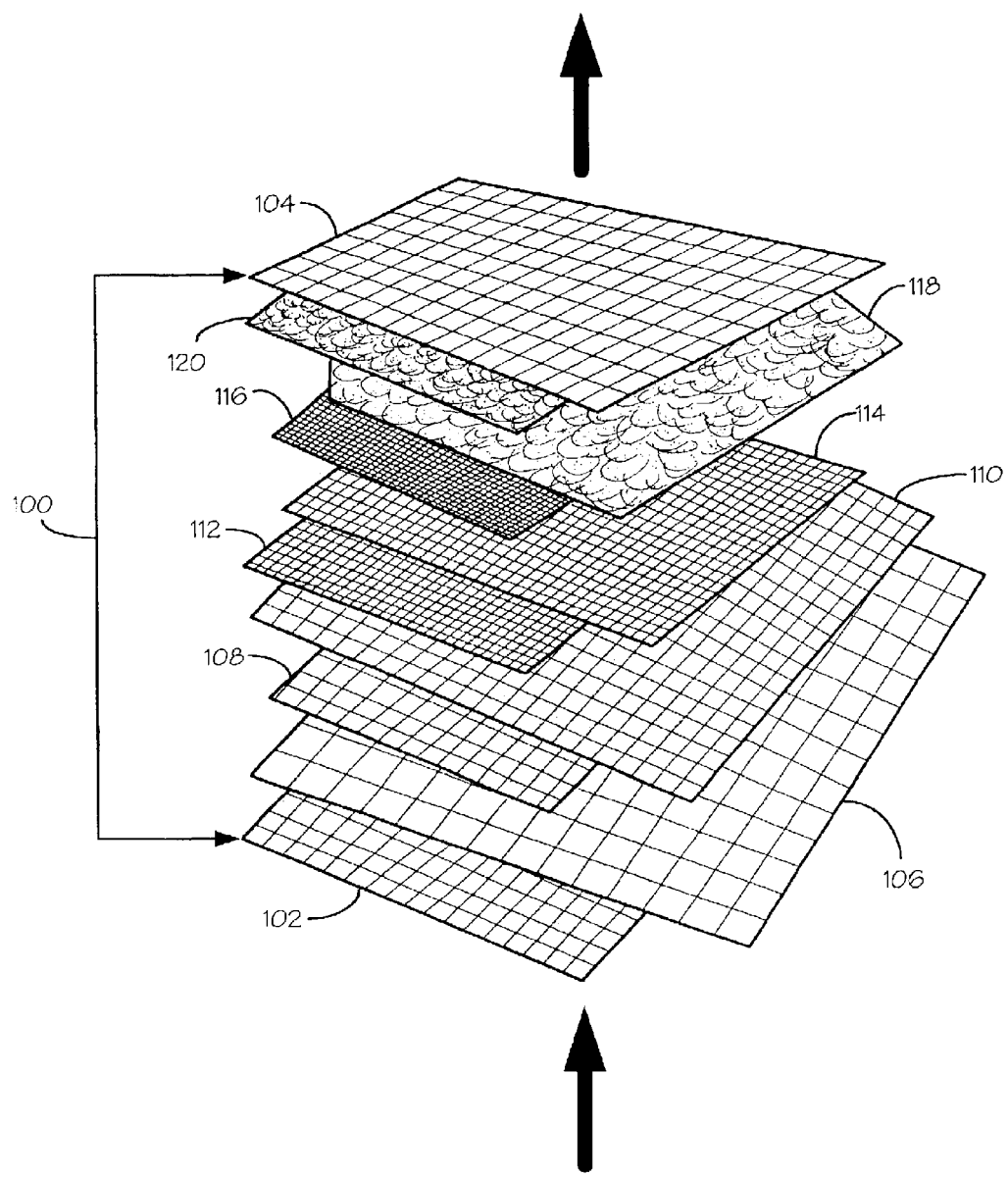
FIG. 1 is a cross-section of the multiple layer air filter media.

FIG. 1 is a cross section of the multiple layer air filter media 100 which comprises several fiber layers 106, 108, 110, 112, 114, 116, 118 and 120 sandwiched or interposed between structural mesh layers 102 and 104. In this illustration, the "dirty," or influent, side of media 100 (formed by structural mesh layer 102) is the side of the filter which is upstream in the flow path of air from the surrounding air into the engine. The "clean," or effluent side of the media (formed by structural mesh layer 104) is the side of the filter which is downstream. The air flowing out the effluent side of the filter is fed into the engine to support the combustion within the engine.

Structural mesh layers 102 and 104 can be made of a lightweight aluminum mesh, although layers 102 and 104 also may be fabricated from various metals, plastics and polymers. An exemplary aperture count for layers 102 and 104 can be approximately 18×14 openings per inch, although other aperture counts may also be suitable. In addition, it may be desirable that mesh layers 102 and 104 be epoxy-coated in order to afford enhanced protection to filter media 100. Although both layers 102 and 104 may be so protected, it may be particularly desirable to epoxy-coat influent mesh layer 102, guarding the thin mesh against granulates, foreign objects, and injurious incidents.

The fiber layers 106, 108, 110, 112, 114, 116, 118 and 120 can include both natural fibers and manufactured fibers. As illustrated in FIG. 1, fiber layers 166, 108, 110, 112, 114 and 116 are natural fiber layers, and fiber layers 118 and 120 are manufactured fiber layers. The natural fiber layers are most conveniently cotton, but other natural fibers such as silk, jute, ramie, flax, cellulosic fibers, wool and the like may be used. The manufactured fiber layers are most conveniently made of synthetic fibers, such as spunbond polyester, but can also be made of other synthetic fabrics (nylon, olefin, acrylic, etc.), polymers, glasses, and modified or transformed natural polymers, and modified cellulosic fibers.

Natural fiber layers 106, 108, 110, 112, 114, and 116 establish a natural fiber filter media region of filter media 100, and the synthetic fiber layers 118 and 120 establish a synthetic fiber filter media region of filter media 100. In filter media 100, it is apparent that synthetic fiber filter media region is in fluid communication with the natural fiber filter media region. As the influent fluid stream passes through the natural fiber filter media region a first portion of the particles in the stream become trapped, so that the synthetic fiber filter media region receives a filtered fluid stream with a residual second portion of the particles therein, trapping a substantial amount of the second portion of particles. In filter media 100, the constituent filter media of both the natural fiber filter media region and the synthetic fiber filter media region are selected with pores or openings formed such that, despite the fibers therein effecting trapping of particles, the fluid stream is able to pass substantially unimpaired through the pores.

In general, where natural fibers are used, such as with fiber layers 106, 108, 110, 112, 114 and 116, it is desirable to use cotton meshes, because the constituent cotton fibers tend to be both highly pileous (that is, each cotton thread has many small hairy fibers sticking out of it) and highly wickable. Cotton meshes can include gauze, cheesecloth and spun laced fabric. Gauze, cheesecloth and similar fabrics thin, open-meshed, low thread-count, plain weave, soft fabric. An example of a cotton gauze which can be advantageously employed in filter media 100 is "absorbent gauze," as described in the United States Pharmacopoeia (USP), which must meet specific standards of construction, chemical purity and absorbency.

TABLE 1 is illustrative of the specified standards of construction to which USP absorbent gauze complies. Of course, other cotton meshes may be used in filter media 100, provided the selected material is comparable to USP absor bent gauze in relevant characteristics, including chemical purity, absorbency, wickability, and so on.

TABLE 1

CONSTRUCTION OF DIFFERENT TYPES OF USP WOVEN GAUZE

| | Average Count | | | |
|---|---|---|---|---|
| | Threads per 2.54 cm. | | Threads per square inch | Weight g per |
| Type | Warp | Filling | (6.45 cm$^2$) | sq. meter |
| I | 41 to 47 | 33 to 39 | 76 to 84 | 43.8 to 55.8 |
| II | 30 to 34 | 26 to 30 | 57 to 63 | 32.9 to 41.9 |
| III | 26 to 30 | 22 to 26 | 49 to 55 | 28.4 to 36.2 |
| IV | 22 to 26 | 18 to 22 | 41 to 47 | 24.5 to 31.1 |
| V | 20 to 24 | 16 to 20 | 37 to 43 | 22.5 to 28.8 |
| VI | 18 to 22 | 14 to 18 | 33 to 39 | 19.8 to 25 |
| VII | 18 to 22 | 8 to 14 | 27 to 35 | 18.1 to 23.1 |
| VIII | 12 to 16 | 8 to 12 | 21 to 27 | 12.1 to 15.5 |

Another exemplary cotton mesh that can be used in filter media 100 is spun-lace, or hydroentangled, non-woven cotton fabric. Spun-lace cotton is a non-woven fabric produced using high-velocity jets or curtains of water to entangle fibers into fiber bundles, in a repeating web-like pattern, thereby forming a strong fabric. This technique preserves the pure fiber condition, which is conducive to making high absorbency products, substantially free of binders and chemical impurities. Spun-lace cotton fabric can be engineered to exhibit structural characteristics tailored to the medium application. For example, with hydro-entangled fabric, fiber bundles may be designed with high density areas that provide a fine capillary structure and allows a rapid absorbency rate. Moreover, the uniformity of the fabric pattern, the open spaces, the stability of fabric openings, the various physical and functional characteristics and the open pattern imparted to the fabric can be different from those obtained with plain-woven gauze.

TABLE 2 is illustrative of exemplary types of spun-laced non-woven cotton fabric, which are generally comparable to certain types of USP woven gauze presented in TABLE 1.

TABLE 2

CONSTRUCTION OF DIFFERENT TYPES OF SPUN-LACED FABRIC

| | Fiber Bundles Per 5.4 cm Range of Bundle | | Bundle Count square inch | Fabric Weight g per sq. |
|---|---|---|---|---|
| Type | MD* | CMD** | (6.45 cm$^2$) | meter |
| A | 32 to 24 | 28 to 20 | 60 to 40 | 10 to 70 |
| B | 23 to 17 | 23 to 17 | 46 to 34 | 10 to 70 |
| C | 23 to 17 | 14 to 10 | 42 to 30 | 10 to 70 |
| D | 23 to 17 | 14 to 10 | 42 to 30 | 10 to 70 |
| E | 17 to 11 | 11 to 5 | 34 to 22 | 10 to 70 |
| F | 14 to 10 | 14 to 10 | 28 to 20 | 10 to 70 |
| G | 14 to 10 | 8 to 4 | 22 to 14 | 10 to 70 |

*Machine Direction
**Cross Machine Direction

Returning to FIG. 1, fiber layers 106, 108, 110, 112, 114 and 116 are provided with increasing thread count or weave fineness, such that fiber layer 106, having the coarsest, or most open weave, mesh, is disposed in proximate contact with dirty side mesh layer 102, and fiber layer 116, having the highest thread count and the finest, or least open weave of the selected fiber meshes, adjacent to or, alternatively, in proximate contact with, clean side mesh layer 104. Interposed between layers 106, 116 can be additional fiber layers, wherein layer 108 is less coarse than layer 106, and layer 114 is more coarse than layer 116. In this manner, a region of natural fiber mesh, gradient-density, depth-loading filter media can be constructed in media 100.

An exemplary arrangement using USP absorbent gauze employs TYPE VIII gauze as fiber layer 106, TYPE VI gauze as fiber layer 108, TYPE V gauze as fiber layer 110, TYPE IV gauze as fiber layer 112, TYPE III gauze as fiber layer 114, TYPE II gauze as fiber layer 116. Referring to TABLE 1, TYPE VIII gauze can have a thread count of 12×10 (i.e., 12 warp and 10 filling threads per inch). TYPE II gauze can have a thread count of 32×28, thus having a much finer weave, relative to TYPE VIII. In some embodiments, it may be desirable to alternate finer and coarser layers, or to provide successive layers of filter media having substantially similar structural characteristics. Furthermore, plain-woven and spun-lace cotton fabrics can be used alone, or in combination, to form this region of natural fiber mesh, gradient-density, depth-loading filter media. A myriad of other natural fiber layer arrangements may also be suitable for use in the natural fiber media.

The synthetic fiber layers 118 and 120 most conveniently comprise spun-bond polyester webs, meshes or mats, which are prepared from drawn, randomly-laid, and thermally-, or ultrasonically-bonded continuous polyester filaments. Preferred varieties of spun-bond filtration media are fabricated without binders, thereby minimizing contamination of air flowing through the media. Exemplary spun-bond polyester fibers include Reemay® 2024 medium, being about 12 mils thick with a basis weight of about 71 g./sq. m.; and Reemay® 2033 medium, being about 17 mils thick with a basis weight of about 100 g./sq. m. Both media are formed from straight, trilobal polyester fibers having a diameter of about 23 microns. Reemay® media are produced by Reemay, Inc., Old Hickory, Tenn., and are well-known in the fluid filtration art. Other synthetic fibers may be used, and that absorbent, efficient, fibers with a low contaminant content, are especially desirable.

As illustrated in FIG. 1, synthetic filter media layers are chosen to provide a gradient-density region. Similar to the arrangement of natural fiber filter layers, less dense layers can be disposed closer to the influent side of the filter, with more dense layers being disposed closer to the effluent side, or in proximate contact with metal mesh layer 104. In FIG. 1, synthetic fiber layer 118 is selected to be less dense than synthetic fiber layer 120, and can be interposed between the finest natural fiber layer 116 and the finest, and most dense, synthetic fiber layer 120. Layer 120 is, in turn, disposed in proximate contact with effluent metal wire mesh 104. Multiple layers 118 and 120 thus provide a region of synthetic fiber mesh, gradient-density, depth-loading filter media.

In certain applications, it may be desirable to provide multiple, perhaps alternating, regions of synthetic fiber mesh, depth-loading filter media, of uniform density, gradient density, or an efficacious combination thereof.

Filter media 100 exhibits superior efficiency in removing a wide range of particle sizes from an influent air stream. Larger particles can be physically trapped by impacting upon, or by being attracted to, the fabric mesh fibers or to the pili, as individual particles or agglomerations of particles. Particle bridge formations tend to be disrupted by the flowing air, causing growing particulate dendrites and agglomerations to collapse and fall through to the next layer of filter material. Smaller particles can be induced to move chaotically by the forces in the air stream, such as velocity changes, pressure changes, turbulence caused by other particles, and interaction with the air molecules. Thus, despite being much smaller than the individual filter media pores and openings, these particles do not follow the air stream, with their erratic motion causing collisions with the filter media fibers and agglomerations of other particles. Therefore, by judiciously selecting the physical characteristics and arrangement of the natural and synthetic filter media layers, a filter constructed according to the principles herein, can provide a high capacity, high efficiency filtration even in harsh operating environments under high airflow conditions.

The lifespan of the filter described above can be extended by treating the filter media with oil or other tacking agent. One or more filter layers may be wetted with oil. Because cotton fibers are generally oleophilic (they like to absorb oil), the oil tends to be thoroughly wicked and absorbed by the fine pili, or hairs, of the cotton fibers. It is desirable to merely wet, and not soak, the filter media 100 with oil, because oil soaking which completely fills the interstices between the fabric threads with oil increases resistance to airflow. By selecting the type and the composition of the oil employed during oil wetting, the individual cotton fiber pili tend to swell, and present an advantageously larger surface area to the flowing air, further enhancing the performance of filter media 100. Suitable tacking agents for wetting the filter media include mineral oil, engine oil, and other tacking agents, and combinations of these components. Suitable tacking agent is conveniently applied in aerosol spray, such as AFE air filter oil available from Advanced Flow Engineering of Corona, Calif.

Figure 2:
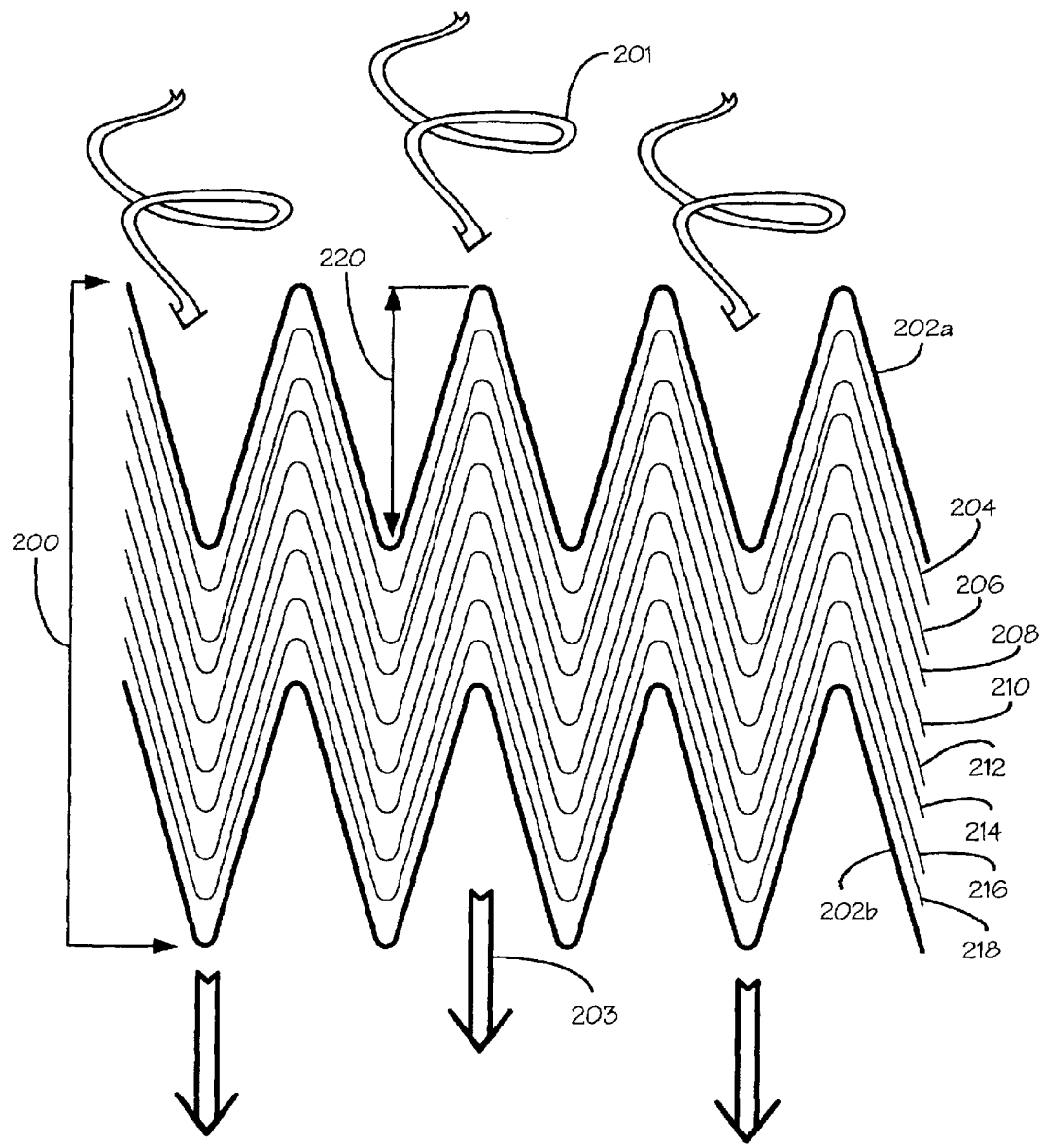
FIG. 2 is a cross-sectional illustration of a pleated embodiment of the multiple layer fluid filter media.

FIG. 2 illustrates a pleated embodiment of the multiple layer filter media in which particulate-bearing influent air stream 201 is cleaned by filter media 200 to provide a substantially particulate-free effluent air stream 203. The filter media 200 is pleated, and is formed by interposing fiber-based filter layers 204, 206, 208, 210 between pleated structural mesh layers 202a, 202b. The mesh layers 202a and 202b are analogous to mesh layers 102 and 104 in FIG. 1.

Filter media 200 includes a region of natural fiber mesh depth-loading filter media, represented by cotton mesh layers 204 and 206, and a region of synthetic fiber mesh, depth-loading filter media, represented by spunbond polyester fiber webs 208 and 210. Although either, or both, of the filter media regions can be of uniform density filter fiber layers, it is desirable in certain embodiments to supply filter media 200 with gradient-density-type regions both in the natural fiber region and in the synthetic fiber region. Accordingly, the weave of cotton mesh layer 204 is generally more coarse than the weave of cotton mesh layer 206, and can be disposed in proximate contact with influent support mesh 202a. In addition, the more dense synthetic fiber layer 210 can be disposed in proximate contact with effluent support mesh 202b. Moreover, the less dense synthetic fiber layer 208 can be interposed between finer cotton mesh layer 206 and the more dense, synthetic fiber layer 210.

TABLE 3 illustrates the construction of five exemplary types of hybrid filter media. Each filter media type varies by the number of media layers or the medium types used to construct filter media 200. The leftmost column of TABLE I provides the reference number corresponding to a particular layer in FIG. 2.

TABLE 3

CONSTRUCTION OF DIFFERENT TYPES OF HYBRID FILTER MEDIA

| FIG. 2 Layer No. | Medium Type | Exemplary Media I | Exemplary Media II | Exemplary Media III | Exemplary Media IV | Exemplary Media V |
|---|---|---|---|---|---|---|
| 204 | USP Gauze | 24 × 20 | 24 × 20 | 24 × 20 | 24 × 20 | 24 × 20 |
| 206 | USP Gauze | 28 × 24 | 28 × 24 | 28 × 24 | 28 × 24 | 28 × 24 |
| 208 | USP Gauze | 32 × 28 | 32 × 28 | 32 × 28 | 32 × 28 | 32 × 28 |
| 210 | USP Gauze | 40 × 32 | 40 × 32 | 40 × 32 | 40 × 32 | 40 × 32 |
| 212 | USP Gauze | 44 × 36 | — | — | 44 × 36 | 44 × 36 |
| 214 | USP Gauze | — | — | — | — | 44 × 36 |
| 216 | REEMAY ® | — | — | 2024 | 2024 | 2024 |
| 218 | REEMAY ® | — | 2024/2033 | 2033 | 2033 | 2033 |

For example, in Exemplary Media V, first natural fiber layer 204 is a layer of USP gauze, having a thread count of 24×20; second natural fiber layer 206 is a layer of USP gauze, having a thread count of 28×24; third natural fiber layer 208 is a layer of USP gauze, having a thread count of 32×28; fourth natural fiber layer 210 is a layer of USP gauze, having a thread count of 40×32; fifth and sixth natural fiber layers 212, 214 are each layers of USP gauze, having a thread counts of 44×36; first synthetic fiber layer 216 is a layer of REEMAY® type 2024 spunbond polyester filter media; and second synthetic fiber layer 218 is a layer of REEMAY® type 2033 spunbond polyester filter media. In each of the Exemplary Media I-V above, each of mesh layers 202a and 202b are desired to be an expanded metal aluminum mesh, having a mesh count between about 18×16 to about 18×14. Furthermore, in each of the Exemplary Media I-V above, a pleat depth 220 of about 30 mm to about 40 mm can be used, with a desirable pleat depth 220 being about 35 mm. It is desirable to make the filter media with about 20 to 40 pleats per inch for a flat pan filter.

Figure 3:
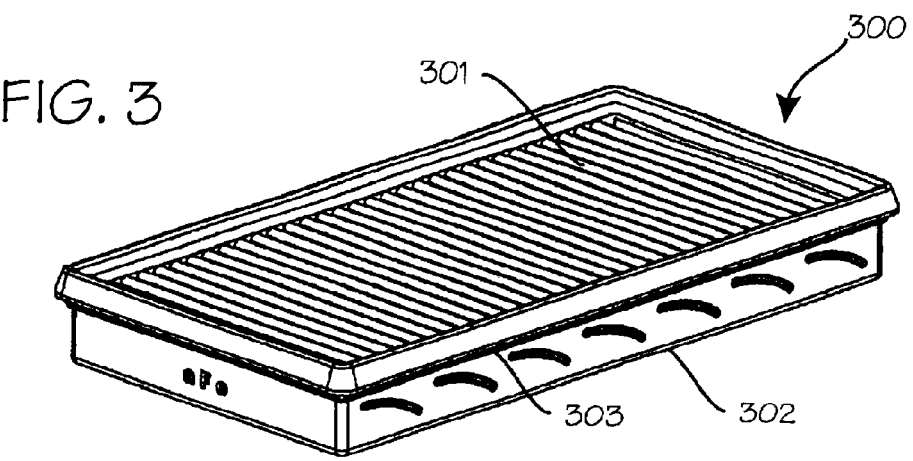
FIG. 3 shows a typical automotive air filter made with the filter media described in FIGS. 1 and 2.

The filter media can be employed in any type of air filter, including flat pan filters, cylindrical filters, cone filters, and ring filters. The filter media is cut, pleated, and formed to the desired shape, and the edges of the filter media are fused into a frame which mates the filter media with the intake air filter housing or air intake tube of the engine with which the filter is used. The frame serves as the seal between the filter and the air intake system of the engine, and is made of a compliant polyurethane or other suitable elastomer. FIG. 3 shows a pan filter 300 provided with the pleated filter media 301 cut to fit an air filter housing in a typical modern car, held within the frame 302 which in turn is provided with a sealing edge 303 for providing an air-tight seal with the air filter housing.

Advantageously, the air filter described above is washable and reusable. Both the natural fiber and synthetic fiber regions can be cleaned with a simple cleaning solution and water, thereby substantially removing the particle load that accrued over the period during which the filter was in use, or cycle lifetime. In embodiments employing oil-wetting, an efficacious amount of oil, such as a mineral oil, may be applied after cleaning to re-wet the oleophilic portions of the filter media. Oil can be applied in an aerosol spray. The filters described above can have a cumulative lifetime of, for example, between 15 to 35 cycle lifetimes. The cumulative lifetime of the filter often can be comparable to the lifetime of the combustion engine in which it is used.

In its typical use, the air filter described above replaces typical automotive air filters and combustion engine air filters. The filter may be cleaned periodically, sprayed with oil and placed back in service after repeated uses. The high capacity of the air filter provides for longer intervals between servicing than can be tolerated with stock air filters.

The components of the air filter described above can be varied, while still obtaining the advantages of the varying layer density. The structural mesh, for example, can comprise wire screen, expanded metal mesh, woven and welded metal mesh, and perforated metal sheets. The particular configuration of the mesh structure, including mesh thickness, rigidity, malleability, mesh opening size and shape, and so forth, can be selected to provide mesh layers 102 and 104 with the desired physical characteristics, including air permeability, strength, longevity, and shape. For example, mesh layers 102 and 104 may be configured such that the mesh openings create an insubstantial contribution to total air flow restriction across filter media 100, yet support and protect the filter medium layers which are sandwiched between the structural mesh layers. The number of natural fiber layers can be varied from the six-layer construction illustrated above. The number of manufactured fiber layers can also be varied from the two-layer construction illustrated above.

Additionally, while the air filter has been described in connection with its application to combustion engines, the filter media may be used in a wider variety of applications, such as air conditioning and air purification for buildings and clean rooms, for cleaning air provided to the intake of air compressors, and for filtering air and gases provided to any industrial system requiring pure air. Thus, while the preferred embodiments of the devices and methods have been described in reference to the environment in which they were developed, they are merely illustrative of the principles of the inventions. Other embodiments and configurations may be devised without departing from the spirit of the inventions and the scope of the appended claims.

I claim:

1. A fluid filter media, comprising:
   a. a natural fiber filter media region receiving an influent fluid stream containing particles, the natural fiber filter media having pores therethrough and being formed from a pileous, absorbent, and wickable natural fiber, the natural fiber filter media region trapping therein a first portion of the particles in the influent fluid stream while the influent fluid stream passes substantially unimpaired through the pores, and creating a filtered fluid stream having therein a second portion of the particles thereby; and
   b. a manufactured fiber filter media region in proximate contact with, and in fluid communication with, the natural fiber filter media region and receiving the filtered fluid stream therefrom, the manufactured fiber filter media region having pores therethrough and being formed from a pre-selected pileous and absorbent manufactured fiber, the manufactured fiber filter media region trapping therein a substantial amount of the particles of the second portion in the filtered fluid stream while the filtered fluid stream passes substantially unimpaired through the pores, and releasing a filtered effluent fluid stream thereby.

2. The fluid filter media of claim 1, wherein the natural fiber is a cotton fiber.

3. The fluid filter media of claim 2, wherein the manufactured fiber is a spunbond polyester fiber.

4. The fluid filter media of claim 3, wherein the manufactured fiber filter media region further comprises spunbound polyester fiber layers.

5. The fluid filter media of claim 4, wherein the manufactured fiber filter media region comprises a first spunbond polyester fiber layer having a first polyester fiber density, and a second spunbond polyester fiber layer having a second polyester fiber density, with the first polyester fiber density being less than the second polyester fiber density, and wherein the first spunbond polyester fiber layer is disposed closer to the receiving of the influent fluid stream and the second spunbond polyester fiber layer is disposed closer to the filtered effluent fluid stream.

6. The fluid filter media of claim 2 wherein the natural fiber filter media region further comprises cotton mesh layers.

7. The fluid filter media of claim 6, wherein at least one of the cotton mesh layers is plain-woven cotton gauze.

8. The fluid filter media of claim 7, wherein the manufactured fiber is a spunbond polyester fiber and the manufactured fiber filter media region comprises spunbond polyester fiber layers.

9. The fluid filter media of claim 6, wherein the manufactured fiber is a spunbond polyester fiber and the manufactured fiber filter media region comprises spunbond polyester fiber layers.

10. The fluid filter media of claim 9, wherein the cotton fiber is oleophilic and further comprising an efficacious amount of oil disposed in the natural fiber filter media region, the oil wetting the cotton fibers, thereby increasing particle trapping by the natural fiber filter media region.

11. The fluid filter media of claim 6, wherein at least one of the cotton mesh layers is a non-woven hydroentangled cotton fabric.

12. The fluid filter media of claim 11, wherein the manufactured fiber is a spunbond polyester fiber and the manufactured fiber filter media region comprises spunbond polyester fiber layers.

13. The fluid filter media of claim 6, wherein the natural fiber filter media region comprises a first cotton mesh layer having a first cotton mesh density, and a second cotton mesh layer having a second cotton mesh density, with the first cotton mesh density being less than the second cotton mesh density, and wherein the first cotton mesh layer is disposed closer to the influent fluid stream and the second cotton mesh layer is disposed closer to the filtered effluent fluid stream.

14. The fluid filter media of claim 13, wherein the manufactured fiber filter media region comprises a first spunbond polyester fiber layer having a first polyester fiber density, and a second spunbond polyester fiber layer having a second polyester fiber density, with the first polyester fiber density being less than the second polyester fiber density, and wherein the first spunbond polyester fiber layer is disposed closer to the second cotton mesh layer, and the second spunbond polyester fiber layer is disposed closer to the filtered effluent fluid stream.

15. The fluid filter media of claim 1, wherein the natural fiber is oleophilic and further comprising an efficacious amount of oil disposed in the natural fiber filter media region, the oil wetting the natural fibers, thereby increasing particle trapping by the natural fiber filter media region.

16. The fluid filter media of claim 1, further comprising two structural mesh layers with the natural fiber filter media region and the manufactured fiber filter media region being interposed in a supported relationship therebetween.

17. A fluid filter comprising:
   a. a natural fiber filter media region receiving an influent fluid stream containing particles, the natural fiber filter media having pores therethrough and being formed from a pileous, absorbent, and wickable cotton mesh, the natural fiber filter media region trapping therein a first portion of the particles in the influent fluid stream while the influent fluid stream passes substantially unimpaired through the pores, and creating a filtered fluid stream having therein a second portion of the particles thereby;
   b. a manufactured fiber filter media region in proximate contact with, and in fluid communication with, the natural fiber filter media region and receiving the filtered fluid stream therefrom, the manufactured fiber filter media region having pares therethrough and being formed from a pre-selected pileous and absorbent spunbond polyester fiber, the manufactured fiber filter media region trapping therein a substantial amount of the particles of the second portion in the filtered fluid stream while the filtered fluid stream passes substantially unimpaired through the pores, and releasing a filtered effluent fluid stream thereby; and
   c. two structural mesh layers with the natural fiber filter media region and the manufactured fiber filter media region being interposed in a supported relationship therebetween;
   wherein the cotton mesh is oleophilic and further comprising an efficacious amount of oil disposed in the natural fiber filter media region, the oil wetting the cotton mesh, thereby increasing particle trapping by natural fiber filter media region.

18. The fluid filter of claim 17, wherein the wickable cotton mesh of the natural fiber filter media region further comprises cotton mesh layers and the spunbond polyester of the manufactured fiber filter media region further comprises spunbond polyester fiber layers.

19. The fluid filter of claim 18:
   a. wherein the natural fiber filter media region comprises a first cotton mesh layer having a first cotton mesh density, and a second cotton mesh layer having a second cotton mesh density, with the first cotton mesh density being less than the second cotton mesh density; and wherein the first cotton mesh layer is disposed closer to the receiving of the influent fluid stream and the second cotton mesh layer is disposed closer to the filtered effluent fluid stream; and
   b. wherein the manufactured fiber filter media region comprises a first spunbond polyester fiber layer having a first polyester fiber density, and a second spunbond polyester fiber layer having a second polyester fiber density, with the first polyester fiber density being less than the second polyester fiber density, and wherein the first spunbond polyester fiber layer is disposed closer to the second cotton mesh layer, and the second spunbond polyester fiber layer is disposed closer to the filtered effluent fluid stream.

20. An air filter for an internal combustion engine, comprising:
   a. a natural fiber filter media region receiving air stream containing particles, the natural fiber filter media having pores therethrough and being formed from a pileous, absorbent, and wickable cotton mesh layers, the natural fiber filter media region trapping therein a first portion of the particles in the influent air stream while the influent air stream passes substantially unimpaired through the pores, and creating a filtered air stream having therein a second portion of the particles thereby;
   b. a manufactured fiber filter media region in proximate contact with, and in fluid communication with, the natural fiber filter media region and receiving the filtered air stream therefrom, the manufactured fiber filter media region having pores therethrough and being formed from a pre-selected pileous and absorbent spunbond polyester fiber layers, the manufactured fiber filter media region trapping therein a substantial amount of the particles of the second portion in the filtered air stream while the filtered air stream passes substantially unimpaired through the pores, and releasing a filtered effluent air stream to the internal combustion engine thereby; and
   c. two structural mesh layers with the natural fiber filter media region and the manufactured fiber filter media region being interposed in a supported relationship therebetween;
   wherein the cotton mesh layers are oleophilic and further comprising an efficacious amount of oil disposed in the natural fiber filter media region, the oil wetting the cotton mesh layers, thereby increasing particle trapping by natural fiber filter media region.

21. The air filter of claim 20:
   a. wherein the natural fiber filter media region comprises a first cotton mesh layer having a first cotton mesh density, and a second cotton mesh layer having a second cotton mesh density, with the first cotton mesh density being less than the second cotton mesh density; and wherein the first cotton mesh layer is disposed closer to the receiving of the influent air stream and the second cotton mesh layer is disposed closer to the filtered effluent air stream; and
   b. wherein the manufactured fiber filter media region comprises a first spunbond polyester fiber layer having a first polyester fiber density, and a second spunbond polyester fiber layer having a second polyester fiber density, with the first polyester fiber density being less than the second polyester fiber density, and wherein the first spunbond polyester fiber layer is disposed closer to the second cotton mesh layer, and the second spunbond polyester fiber layer is disposed closer to the filtered effluent air stream.

* * * * *

UNITED STATES PATENT AND TRADEMARK OFFICE
CERTIFICATE OF CORRECTION

PATENT NO. : 6,811,588 B2
DATED : April 5, 2005
INVENTOR(S) : Shahriar Nick Niakan It is certified that error appears in the above-identified patent and that said Letters Patent is hereby corrected as shown below:

<u>Title page,</u>
Item [75], Inventor, "Shahriar Nick Niakin" should read -- Shahriar Nick Niakan --

Signed and Sealed this

Twenty-fourth Day of May, 2005

JON W. DUDAS
*Director of the United States Patent and Trademark Office*